United States Patent [19]
Trimble

[11] 3,924,928
[45] Dec. 9, 1975

[54] ATTACHMENT FOR REFLECTORS FOR SPOKE WHEELS

[76] Inventor: Robert C. Trimble, 258 Main St., Northboro, Mass. 01532

[22] Filed: Mar. 12, 1975

[21] Appl. No.: 557,625

[52] U.S. Cl. .................. 350/99; 350/97; 301/37 SA
[51] Int. Cl.².... G02B 5/12; B60B 11/00; B60R 7/00
[58] Field of Search........... 350/97, 99, 97 UX, 303; 301/37 SA; 280/289

[56] References Cited
UNITED STATES PATENTS

| | | | |
|---|---|---|---|
| 2,344,542 | 3/1941 | Fike | 350/97 |
| 2,752,816 | 1/1955 | Austing | 350/99 |
| 3,809,434 | 5/1974 | Linder | 350/99 |

*Primary Examiner*—Alfred E. Smith
*Assistant Examiner*—B. W. de los Reyes
*Attorney, Agent, or Firm*—Melvin E. Frederick, Esq.

[57] ABSTRACT

An attachment for combination with wheel reflectors attached to and/or carried by the spokes of spoke wheels. Wheel reflectors normally provide increased visibility from only right angles to the direction of travel. The attachment, of double-faced reflectorized construction in its preferred embodiment, is carried by the wheel reflector at substantially right angles thereto and is of a size to pass between the wheel supporting frame members to which the wheel is attached. Being disposed normal to the wheel reflector, the attachment increases visibility in directions more or less parallel to the direction of travel and in use moves up and down with rotation of the wheel thereby providing the maximum degree of visibility from both forwardly and rearwardly directions-directions from which side reflectors are totally invisible.

10 Claims, 8 Drawing Figures

ATTACHMENT FOR REFLECTORS FOR SPOKE WHEELS

The present invention relates to a novel, decorative and safety attachment for use in conjunction with but disposed normal to reflectors attached to or carried by the spokes of a spoke wheel and lying generally in the plane of the wheel.

In decorative and reflector devices such as are commonly used at present, such devices are generally in the form of small flat faceted glass devices permanently mounted by means of screws and the like to the fenders, frame, spokes or rim of the wheels of the vehicle. Devices of this type are small, are limited in reflection value, and tend to give a false sense of security inasmuch as the drivers of other vehicles have difficulty seeing the small devices, or see them too late to avoid a collision. Reflectors heretofore used for this purpose are effective only over a narrow angle of view and are generally totally ineffective when viewed from a direction normal to that in which the reflector lies. As noted above, prior reflectors are subject to the particular disadvantage in that they are ineffective in signalling vehicles approaching at right angles. Thus, spoke mounted wheel reflectors now required by law are reasonably visible to a vehicle approaching at right angles. Not only do they reflect light, but due to the rotation of the wheel on which they are mounted, they appear as a highly visible area having both a forward and circular motion. For a more thorough discussion of such required spoke mounted side reflectors, reference is made to U.S. Pat. Nos. 3,768,433 and 3,781,082, the contents of which are incorporated as if set out at length herein.

However, such wheel reflectors are totally ineffective with respect to a vehicle approaching from the front or rear. In this case, reliance for detection must be placed on the presence of non-movable reflectors mounted in conventional manner, i.e., fixedly attached to the rear fender and facing rearward, or perhaps one fixedly attached to the front and facing forward. Alternately, a bicycle or the like might be equipped with a tubular member of the type described in my U.S. Pat. No. 3,834,765, issued Sept. 10, 1974, the contents of which are incorporated as if set out at length herein. If the tubular member is of a cross section greater than that of the tire, then, of course, it does not function solely as a spoke mounted side reflector and a small portion may be visible as a substantially non-movable reflector from, for example, directly in front of the bicycle.

Thus, as may now be seen, various reflectors have been mounted on bicycle fenders, handle bars, and other parts of the bicycle. Such reflectors have been adapted to meet purposes of safety and attractiveness. So far as is known, no reflector has been provided which can be efficiently mounted on a wheel and provide a high degree of visibility from directions both in front of and behind. Both Federal and certain state specifications now in effect require "side lighting" on bicycles as well as on automobiles and trucks. Such "side lighting" is attained by using various optic and reflector elements. Such reflectors are variously mounted with or without brackets and may be of the reflex reflector type, including cube corner reflectors. The elements may be comprised entirely of reflector elements or be comprised of both optic and reflector elements.

Side reflex illumination is now commonly provided by conventional side markers or wheel reflectors, attached to the wheels and/or tubular members as set forth in my aforementioned U.S. Pat. No. 3,834,765; rear illumination is commonly provided with a fender mounted electric tail light and/or reflex reflector; and frontal illumination by an electric light and/or reflex reflector.

It is an important object of the present invention to provide an improved reflector element which can be mounted on a wheel which, in use, moves up and down with rotation of the wheel and provides the maximum degree of visibility from forwardly and rearwardly directions.

Another object of the present invention is to provide, in a manner as hereinafter set forth, a decorative and/or safety reflective attachment that may be expediously combined with a side reflector for a spoke wheel without structurally altering the side reflector, the wheel, interfering with the use of or servicing of the wheel, or requiring the use of any attaching means such as clamps, screws and the like.

Another object of the present invention is to provide a decorative and/or reflective device for combination with a side reflector for spoke wheels which is of the simplest construction, strong, durable, light-weight, attractive in appearance, unbreakable, easily cleaned, and which may be manufactured at low cost.

A still further object of the present invention is to provide a generally flat reflective member that is easily combined with required side reflectors for spoke wheels and does not require the use of any tools for installation or removal, and which is not substantially affected by either rotation or vibration of the wheel.

A further object of the present invention is the provision of a reflective device for combination with required side reflectors for spoke wheels which rotate with the side reflector and which can be seen from those directions in which the side reflector is invisible.

A still further object of the present invention is the provision of a reflective device which can easily be mounted without requiring the use of tools or without the necessity of making any modifications or providing means to attach the reflective device.

The above objects together with other objects and advantages which will become subsequently apparent reside in the details of construction and operation as more fully hereinafter described and claimed, reference being had to the accompanying drawings forming a part hereof, wherein like numerals refer to like parts throughout, and in which:

The present invention is especailly useful with bicycles of the conventional type which includes a frame, a front fork mounted upon the hub of the front wheel, the front fork being pivotally mounted with respect to the frame and adapted to be steered by handle bars. Rear fork members converge at the rear end and are connected to the hub of a rear wheel. The rear wheel hub carries a small sprocket which is connected by a drive chain to a large pedal sprocket. Mounted for rotation with the large sprocket are oppositely extending crank arms carrying pedals. A seat for the rider is carried by the frame. Depending upon the type of construction, a conventional type of coaster brake may be provided in the rear hub or caliper type brakes actuated from the handle bar may be provided on either or both of the wheels.

Figures 1, 5:
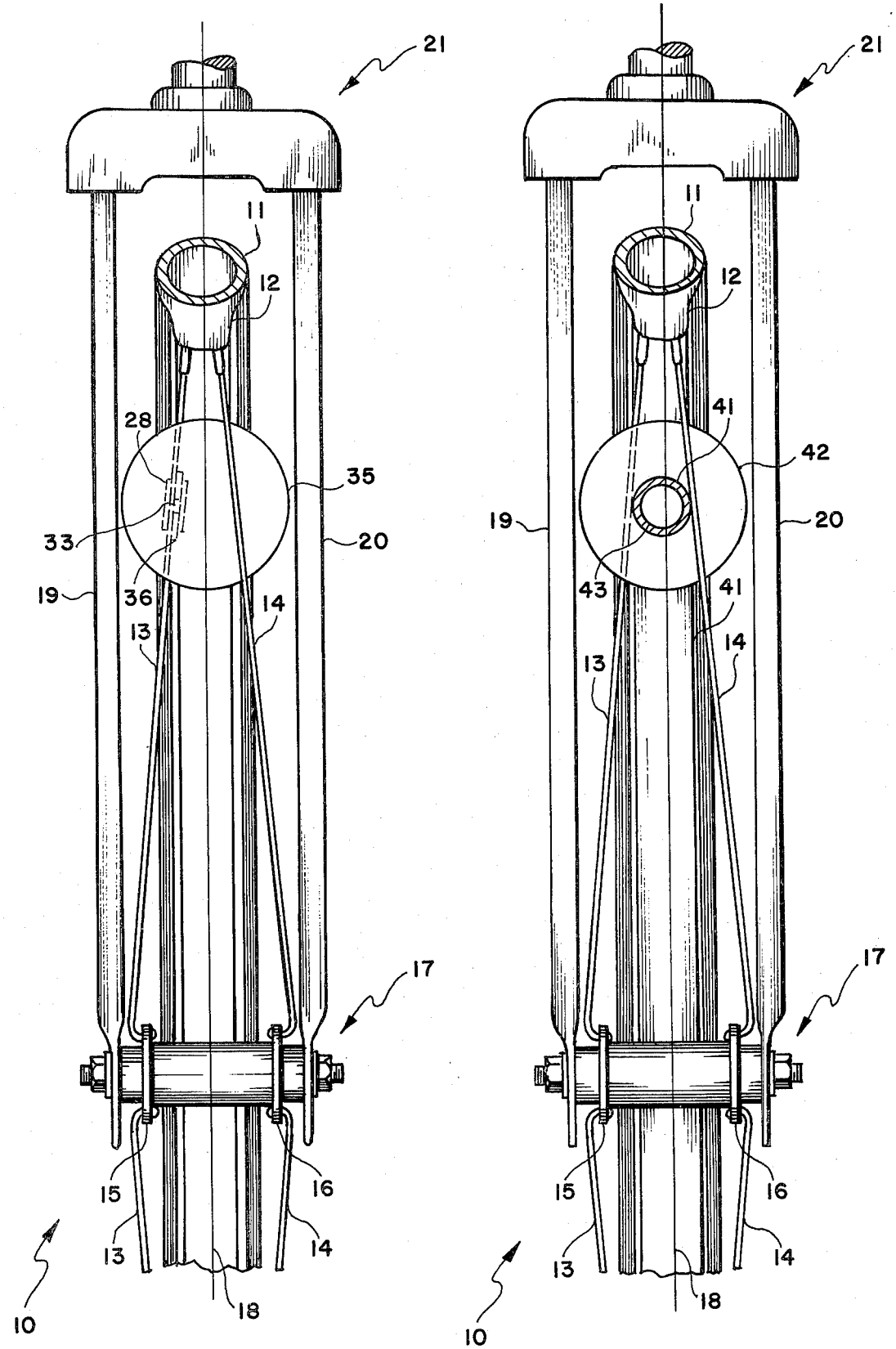
FIG. 1 is a fragmentary cross-sectional view of a spoke wheel with a wheel reflector and a device in accordance with the invention.
FIG. 5 is a fragmentary side elevation view of that shown in FIG. 4.
Figures 2, 3:
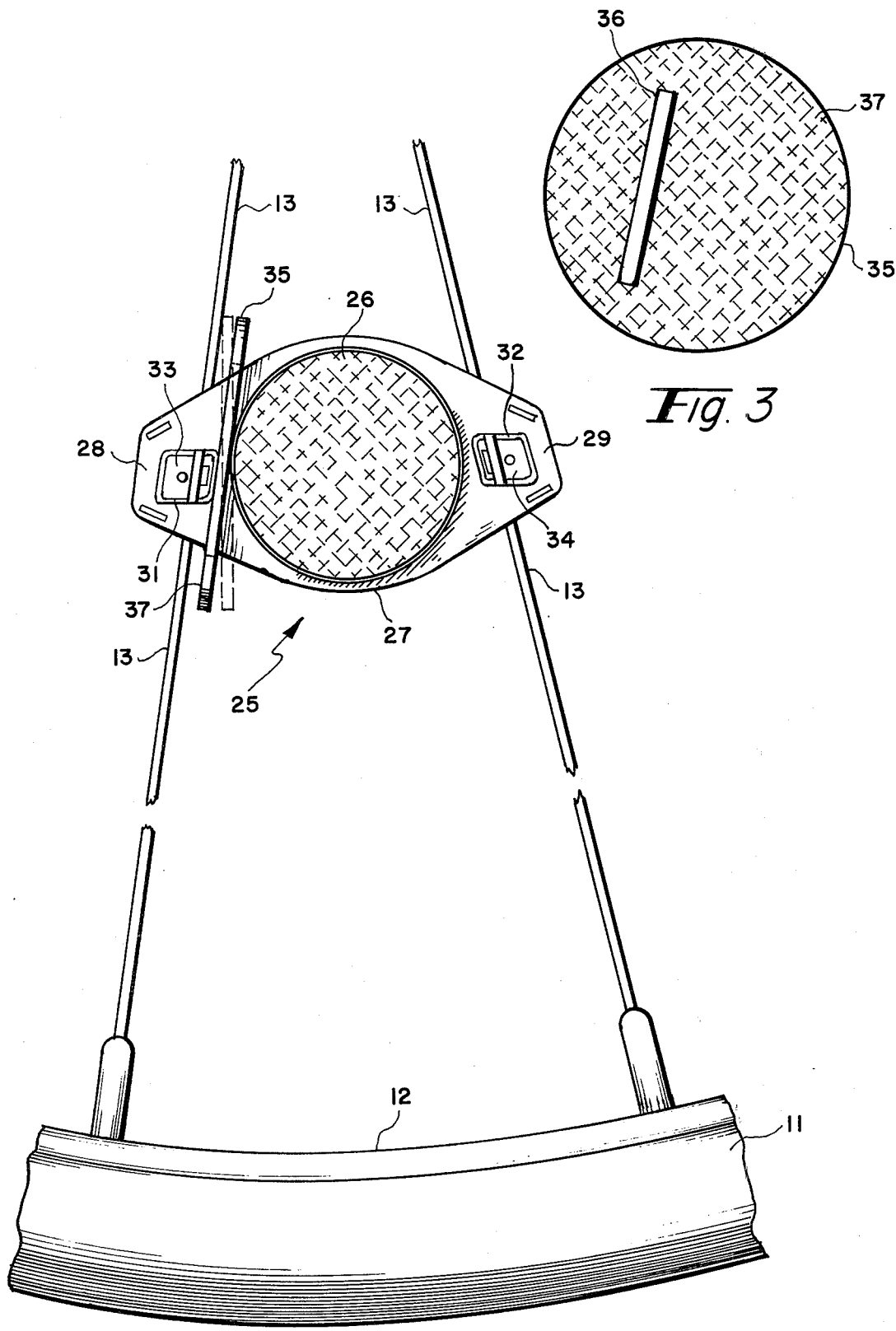
FIG. 2 is a fragmentary side elevation of the wheel reflector and device in accordance with the invention.
FIG. 3 is a front view of the reflector device shown in FIG. 1 and FIG. 2.

Directing attention now to the wheels, FIG. 1 and FIG. 2 illustrate by way of example, a portion of a spoke wheel designated generally by the numeral 10 for bicycles and the like comprising a pneumatic tire 11, a rim 12, and spokes 13 and 14. As is well-known, the spokes 13 and 14 are alternately secured to opposite ends 15 and 16 of an axially elongated hub 17. In other words, the spokes 13 are attached to end 15 of the hub 17 of the wheel 10 and define a cone surface converging to the left as shown in FIG. 1, whereas the spokes 14 extend to the other end 16 of the hub and define a second cone surface on the other side of the wheel and extending to the right. As may be seen in FIG. 1, the spokes 13 and 14 slope in opposite directions from a plane 18 passing through the center of the rim and halfway between the ends of the hub 17. The wheel 10 is rotatably carried by and between two wheel supporting members 19 and 20 which may comprise a front wheel fork 21.

Disposed on and carried by a pair of adjacent spokes as best seen in FIG. 2, is a wheel reflector generally designated by the number 25. The wheel reflector 25, such as, for example, a GEM 90 reflector meeting Department of Transportation requirements, manufactured and sold by EXCEL Corporation, Franklin Park, Ill., may comprise double faced reflector means 26 fixedly disposed in the center of a plastic frame member 27 having opposed end portions 28 and 29. The end portions 28 and 29 are each provided with openings 31 and 32 covered by offset tabs or ear members 33 and 34 which, in cooperation with the end portions, are adapted to receive and firmly grip a spoke. As is well-known to those familiar with the repair and maintenance of bicycles, such wheel reflectors are adapted to permit the engagement of one end portion with first one spoke and then engagement of the other end portion with an adjacent spoke.

Such reflectors, while very effective with respect to light coming at right angles to the direction of travel of a bicycle or the like equipped with such a reflector, they are, of course, totally ineffective with respect to one positioned substantially in front of or behind the bicycle.

To simply, economically, and effectively overcome the abovenoted deficiency, in accordance with the invention, there is provided a thin reflector member or device 35 having an opening 36 to receive an end portion of the wheel reflector whereby it may be slid thereover a distance to permit the end portion to be attached to a spoke. The member 35 needs no additional attachments and may be made to fit with little or no movement on a wheel reflector or to permit some movement as suggested by the illustration of member 35 in both solid and broken lines in FIG. 2.

The reflector member 35 is preferably fabricated from any suitable resilient plastic material and provided in any suitable manner with reflectorized surfaces 37 and 38. For use with the type of wheel reflectors illustrated, which are attached to the spokes, the opening 36 must not only be of the proper size to permit it to be mounted on a given wheel reflector, but it must be offset (see FIG. 3) such that when it is mounted in operative position, it will be centered between the wheel supporting members. This is because any wheel reflector carried by the spokes are of necessity themselves offset from the central plane 18. Further, in the case of a reflective member 35 having a circular configuration as shown merely by way of example, its diameter (or dimension normal to the plane of rotation of the wheel) must be sufficiently less than that between the wheel supporting member that it will freely pass between them. However, the reflective member 35 is preferably provided with just sufficient flexibility that should it encounter a wheel supporting member or obstruction, it will not cause the wheel to cease turning or the reflector to break. Excessive or an unnecessarily high degree of flexibility is not desirable because in this case, wind pressure can cause the reflective member 35 to be bent back on itself and thereby reduce, if not destroy, its effectiveness and/or cause it to be flexed back and forth and thereby result in early failure due to fatigue.

While the reflective member 35 may be formed of a number of resilient and/or compressible materials including rubber, conventional synthetic plastics are preferred because of their low cost, the ease with which they may be formed and/or combined with other materials such as fluorescent dyes and light reflective particles or materials. The opposite faces of a reflective member 35 in accordance with the invention may be provided with a light reflective outer surface as by coating or applying under a protective transparent coating a light reflective material or surface having, for example, a large number of small refracting and/or reflecting prismatic surfaces for receiving light and re-directing it generally along its incoming path. Alternately, it may include a fluorescent dye which fluoresces both under sunlight and artificial light.

Reflective member 35 is attached to a wheel by inserting an end portion 28 of a wheel reflector 25 through the opening 36 (see FIG. 2 and FIG. 3) a distance to permit attachment of that end portion to a spoke. The other end portion of the wheel reflector is then attached to the next adjacent spoke in conventional manner and the wheel reflector adjusted to permit minimum free movement of the reflective member 35 and/or the reflective member 35 is moved to contact the spoke.

It will now be apparent that a reflective member 35 in accordance with the invention attached as shown and described needs no separate attaching means, is insensitive to rotation or vibration of the wheel and is inexpensive and simple to manufacture.

Figure 4:
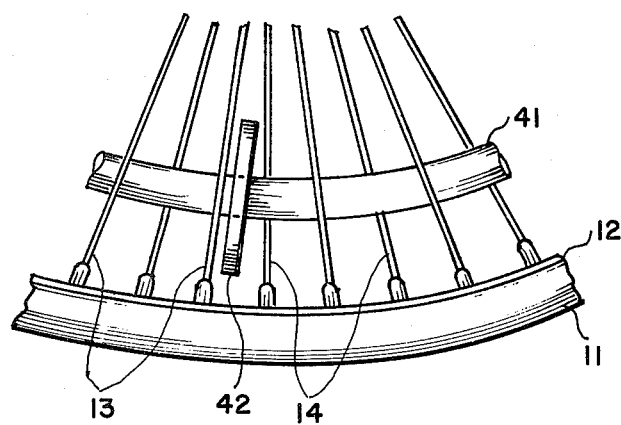
FIG. 4 is a fragmentary view in side elevation of a spoke wheel with a ring reflector and an annular shaped device.

Directing attention now to FIG. 4 and FIG. 5, there is shown an embodiment for use in combination with a tubular member 41 shown and described in my above-mentioned U.S. Pat. No. 3,834,765.

For this case, the reflective member 42 is provided with an axial or central opening to permit it to be slid onto the tubular member 41 and located intermediate a pair of adjacent spokes. Of course, one or a plurality of reflective members 42 may be utilized.

Figure 6:
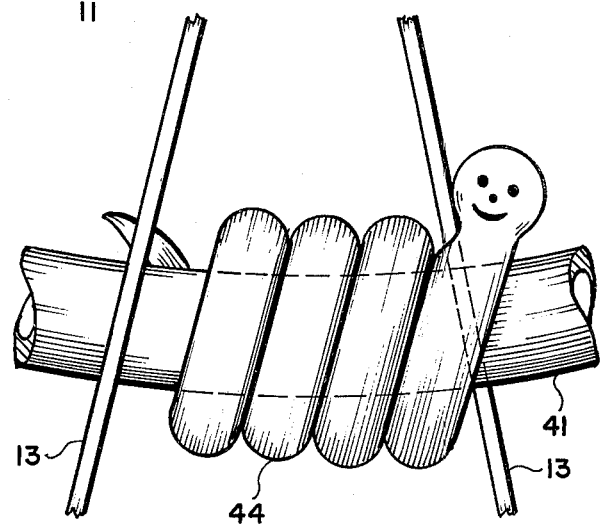
FIG. 6 is a fragmentary side elevation view of an alternate embodiment for use with the ring reflector of FIG. 4.

FIG. 6 shows a modification wherein the reflective member may be made in the form of a "glow worm" 44 or the like to provide both decorative and safety features. Any decorative form or shape may be used so long as it will pass between the wheel supporting members.

Figure 7:
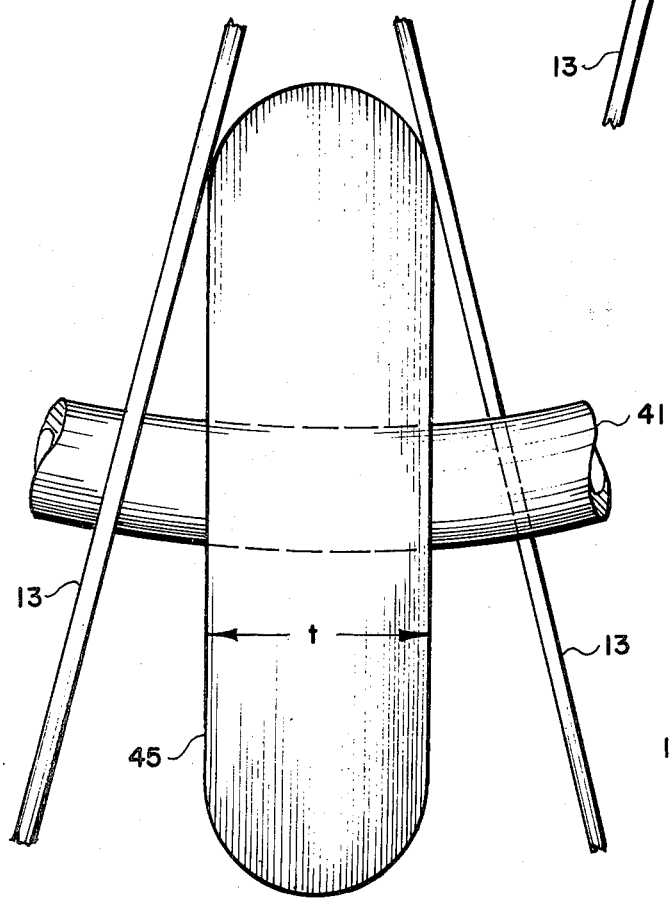
FIG. 7 is a fragmentary side elevation view of a further embodiment for use with the ring reflector of FIG. 4.

FIG. 7 shows a still further modification wherein the reflective member is provided with a "donut" configuration 45 such that it has a substantial dimension parallel to the plane of the wheel. Preferably, the "donut" embodiment is of such thickness "$t$" as to contact adjacent spokes when mounted on a tubular member 41. Further, it is also preferably of a hollow nature to reduce manufacturer costs and to keep its weight to a minimum.

Figure 8:
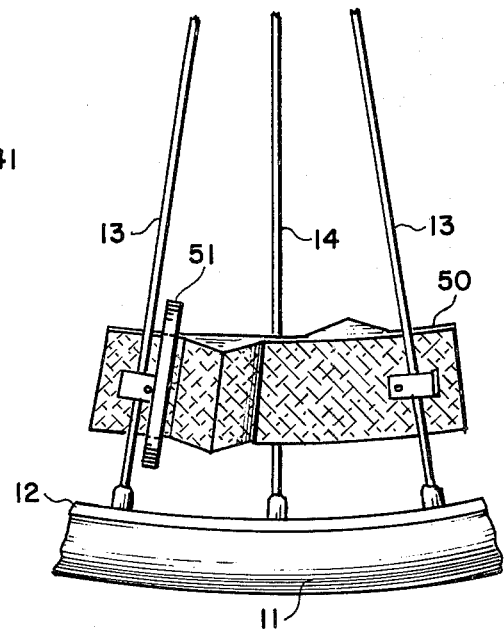
FIG. 8 is a fragmentary view in side elevation of a spoke wheel showing a device in accordance with the invention substantially as shown in FIG. 3 carried by an elongated wide angle wheel reflector.

FIG. 8 shows a portion of a spoke wheel similar to that shown in FIG. 4, but carrying an elongated wide angle wheel reflector 50. This type of wheel reflector, such as, for example, the 1975 model wide angle reflector meeting Department of Transportation requirements manufactured and sold by Gulco Division, Bright Star Industries, Inc. comprises adjacent prismatic reflective surfaces, disposed at an angle to the reflective surface or surfaces adjacent thereto to provide visibility up to 50° from each side of center of a reflector. Opposed ends of the reflector are each provided with grooved screw type fittings to engage and grip a spoke. A further wide angle reflector, also providing visibility up to 50° from each side of center, but having opposed flat outer surfaces, is part number 07730, manufactured and distributed by Schwinn Bicycle Company, Chicago, Ill. A reflective member 51, which may be of a substantially rectangular or circular configuration depending on the depth of the reflector 50, is provided with an appropriately located opening to receive and pass over one end of the reflector 50. The reflective member 51 is carried on the wheel reflector 50 in much the same manner as the reflector 35 of FIG. 2. Similarly, the wheel reflector 50 is attached to the spokes of a wheel in substantially the same manner as is the reflector 25 of FIG. 2.

As will now be evident, a reflective member formed of a resilient material when combined with a wheel reflector provides a new and novel decorative and reflective member and is of particular additional value from a safety point of view. Such a device does not in any way affect servicing or use of a wheel with which it is combined. Thus, the tire may be inflated or repaired, the wheel removed or attached to the frame, the wheel padlocked, the spokes adjusted, or the wheel trued with the member in place. It is virtually unbreakable; no tools are required for its installation and retention; it may be installed by anyone old enough to ride a bicycle, does not tent to collect dirt, oil and the like; and when it does get dirty, it may be cleaned by simply wiping it with a cloth. It is inexpensive to manufacture and purchase and will snugly fit existing bicycle and motorcycle wheel side reflectors. Reflective members in accordance with the invention may be of any desired shape or configuration including round or rectangular and may be made decorative in the form of faces, flowers, donuts, worms and the like. Even if the reflective member is made from sheet material, its edge or edges as well as the front and rear surfaces may be reflectorized to increase visibility from all directions. A reflective member in accordance with the invention will move through a much greater distance than, for example, pedals having reflective portions.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A safety device in combination with a wheel mounted reflector adapted to be carried by the spokes of a spoke wheel rotatably carried by and between two wheel supporting members, said device comprising:
   a. a light reflective member having an opening to receive and engage a wheel reflector, said light reflecting member having a thickness and said opening being of a size that when said light reflecting member is carried by a wheel reflector attached to a spoke wheel, said light reflecting member engages and is substantially held against movement by said wheel reflector and at least one spoke.

2. The device of claim 1 comprising a pair of light reflecting surfaces facing in opposite directions.

3. The device of claim 1 wherein said opening is offset from the centers of said light reflective member and said light reflective member has a dimension normal to the greatest dimension of said opening that is less than the distance between said wheel supporting members whereby when said light reflecting member is carried by a side reflector, it will pass between said wheel supporting members during rotation of said spoke wheel.

4. The device of claim 3 comprising a pair of light reflecting surfaces facing in opposite directions.

5. The device of claim 4 wherein the said dimension of said light reflecting member is less than three inches to freely fit between the wheel supporting members of a front wheel bicycle fork.

6. The device of claim 1 wherein said light reflecting member is of a size that when carried by a wheel reflector, it will freely fit between the wheel supporting members.

7. The device of claim 6 wherein said light reflecting member is substantially annular in shape and said opening is centrally located.

8. The device of claim 7 wherein said light reflecting member is substantially donut shaped and of a thickness to engage and contact adjacent spokes.

9. The device of claim 1 wherein said light reflecting member is flexible whereby if it strikes a wheel supporting member during use it will not break or cause the wheel to cease turning.

10. A safety reflector device in combination with a wheel mounted reflector having a reflective center position intermediate opposed end portions adapted for gripping attachment to respectively two adjacent spokes of a spoke wheel rotatably carried by and between two wheel support members, said device comprising:

a. a light reflecting member having an elongated opening to receive a side reflector end portion and permit said end portion to pass through it, said light reflecting member having a thickness and said opening being of a length that when said light reflecting member is carried by a side reflector end portion attached to a spoke wheel said light reflecting member engages and is substantially held against movement by said side reflector and the spoke gripped by the side reflector end portion passing through said light reflecting member.

* * * * *